US006973616B1

(12) United States Patent
Cottrille et al.

(10) Patent No.: US 6,973,616 B1
(45) Date of Patent: Dec. 6, 2005

(54) ASSOCIATING ANNOTATIONS WITH A CONTENT SOURCE

(75) Inventors: Scott C. Cottrille, Redmond, WA (US); Yoram Yaacovi, Redmond, WA (US); Brian S. Christian, Redmond, WA (US); Bruce A. MacNaughton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/339,634

(22) Filed: Jun. 24, 1999

(51) Int. Cl.[7] .............................................. G06F 17/00
(52) U.S. Cl. ................................................. 715/512
(58) Field of Search .............................. 707/512, 537; 709/203, 217; 715/512, 537

(56) References Cited

U.S. PATENT DOCUMENTS

| | | | | |
|---|---|---|---|---|
| 5,146,552 A | | 9/1992 | Cassorla et al. ............ 395/145 |
| 5,583,980 A | * | 12/1996 | Anderson ................... 345/473 |
| 5,600,775 A | * | 2/1997 | King et al. ................. 707/500 |
| 5,796,393 A | * | 8/1998 | MacNaughton et al. .... 345/733 |
| 5,822,539 A | * | 10/1998 | van Hoff .................... 709/236 |
| 5,826,025 A | * | 10/1998 | Gramlich .................... 709/217 |
| 5,870,767 A | * | 2/1999 | Kraft, IV ................. 707/501.1 |
| 6,081,829 A | * | 6/2000 | Sidana ....................... 707/512 |
| 6,094,675 A | * | 7/2000 | Sunaga et al. ............... 707/10 |
| 6,105,055 A | * | 8/2000 | Pizano et al. .......... 340/825.01 |
| 6,230,170 B1 | * | 5/2001 | Zellweger et al. .......... 345/467 |
| 6,266,683 B1 | * | 7/2001 | Yehuda et al. .............. 707/512 |
| 6,275,827 B1 | * | 8/2001 | deVries et al. .............. 707/102 |
| 6,289,362 B1 | * | 9/2001 | Van Der Meer ......... 707/501.1 |
| 6,389,434 B1 | * | 5/2002 | Rivette et al. .............. 707/512 |
| 6,489,954 B1 | * | 12/2002 | Powlette ..................... 345/520 |

OTHER PUBLICATIONS

"Scope of the Annotation Protocol", Dec. 1995, <http://www.hypernews.org/~liberte/www/annotation-protocol-design>, pp. 1-3.*
Schickler et al., "Pan-Browser Support for Annotations and Other Meta-Information on the World Wide Web", May 1996, Fifth International World Wide Web Conference, pp. 1-16.*
Kim et al., "VIRON: An Annotation-Based Video Information Retrieval System", 1996, IEEE, pp. 298-303.*
Bargeron et al., "Annotations for Streaming Video on the Web: System Design and Usage Studies", Mar. 1999, Elsevier Science, <http://research.microsoft.com/research/pubs/view.aspx?tr_id=194>, p. 1.*

(Continued)

*Primary Examiner*—Sanjiv Shah
(74) *Attorney, Agent, or Firm*—Christensen O'Connor Johnson Kindness PLLC

(57) ABSTRACT

A computing system capable of associating annotations with millions of content sources is described. An annotation is any content associated with a document space. The document space is any document identified by a document identifier. The document space provides the context for the annotation. An annotation is represented as an object having a plurality of properties. The annotation is associated with a content source using a document identifier property. The document identifier property identifies the content source with which the annotation is associated. A scalable computing system for managing annotations responds to requests for presenting annotations to millions of documents a day. The computing system consists of multiple tiers of servers. A tier I server indicates whether there are annotations associated with a content source. A tier II server provides an index to the body of the annotations. A tier III server provides the body of the annotation.

19 Claims, 5 Drawing Sheets

OTHER PUBLICATIONS

W3C "Annotea Project", Mar. 2001, <http://annotest.w3.org/>, p. 1.*

Li, Francis, "Microsoft Research Annotation Ssytem (MRAS)", Apr. 2001, <http://www.francisli.org/portfolio/mras.html>, p. 1.*

Kahan et al., "Annotea: An Open RDF Infrastructure for Shared Web Annotations", May 2001, ACM, <http://www10.org/cdrom/papers/488/>, pp. 1-19.*

"Alexa 3.0—Quick Tour: Alexa Menu", http://www.alexa.com/alexa30/tour/tour_30_alexamenu.html (2 pages).

"Alexa 3.0—Quick Tour: Alexa Snapshot", http://www.alexa.com/alexa30/tour/tour_30_snapshot.html (1 page).

"Alexa 3.0—Quick Tour: Auto Launch", http://www.alexa.com/alexa30/tour/tour_30_autolaunch.html (1 page).

"Alexa 3.0—Quick Tour: Contact Information", http://www.alexa.com/alexa30/tour/tour_30_sitereg.html (1 page).

"Alexa 3.0—Quick Tour: Horizontal—Vertical", http://www.alexa.com/alexa30/tour/tour_30_horizontal.html (2 pages).

"Alexa 3.0—Quick Tour: Overview", http://www.alexa.com/alexa30/tour/index.html (1 page).

"Alexa 3.0—Quick Tour: Related Links", http://www.alexa.com/alexa30/tour/tour_30_related.html (1 page).

"Alexa 3.0—Quick Tour: Search", http://www.alexa.com/alexa30/tour/tour_30_search.html (1 page).

"Alexa 3.0—Quick Tour: Site Statistics", http://www.alexa.com/alexa30/tour/tour_30_sitestats.html (1 page).

"Annotation Systems", http://dri.cornell.edu/pub/davis/Annotation/others.html, File last modified Oct. 21, 1995.

* cited by examiner

ASSOCIATING ANNOTATIONS WITH A CONTENT SOURCE

FIELD OF THE INVENTION

This invention relates generally to information systems and more particularly to a computing system that is capable of associating annotations with millions of content sources.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, 1999 Microsoft Corporation. All Rights Reserved.

CROSS-REFERENCES TO RELATED APPLICATIONS

This application is related to co-filed and co-assigned U.S. patent application Ser. No. 09/339,635, filed on Jun. 24, 1999, entitled "Scalable Computing System for Managing Dynamic Communities." This application is also related to co-filed and co-assigned U.S. patent application Ser. No. 09/339,733, filed on Jun. 24, 1999, entitled "Scalable Computing System for Managing Annotations."

BACKGROUND OF THE INVENTION

The Internet is a worldwide collection of networks that span over 100 countries and connect millions of computers. As of 1998, the Internet had more than 100 million users worldwide and that number continues to grow rapidly. The World Wide Web (WWW) is one of the fastest growing aspects of the Internet. The WWW is composed of computers that support the hypertext transfer protocol (HTTP) which is a common protocol for exchanging information. A WWW client program, known as a browser, runs on a user's computer. One commonly available browser is Microsoft's Internet Explorer brand web browser.

A variety of content sources for text, graphics, sound, and video can all be accessed via the WWW with a browser. Most users who access a content source are unable to modify the content source. However, there are many reasons why users who did not create a content source might want to communicate with other users about the content source. For example, users may wish to share a common interest, to provide additional information relevant to a content source, to critique or review a content source and so on.

For these and other reasons, there is a need in the art for a computing system that associates annotations with a variety of content sources.

SUMMARY OF THE INVENTION

A computing system capable of associating annotations with millions of content sources is described. An annotation is any content associated with a document space. The document space is any document identified by a document identifier. The document space provides the context for the annotation.

One aspect of the invention is a method of associating an annotation with a content source. An annotation is represented as an object having a plurality of properties. The annotation is associated with a content source using a document identifier property. The document identifier property identifies the content source with which the annotation is associated.

Another aspect of the invention is a method of presenting an annotation that is associated with a content source. A document identifier for a content source is sent to a tier I server. A first response is received from the tier I server. The first response comprises an indication of whether one or more annotations are associated with the document identifier and a reference to a tier II server maintaining additional information for each one of the annotations associated with the document identifier. A request is sent to the tier II server for additional information for one of the annotations associated with the content source. A second response is received from the tier II server. The second response comprises one or more properties for the annotation and a reference to a tier III server for the annotation. An annotation identifier for the annotation associated with the content source is sent to the tier III server. A third response is received from the tier III server. The third response comprises a body for the annotation identified by the annotation identifier.

In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, annotations are described in more detail. In the fourth section, an example method of presenting an annotation is provided. In the fifth section, a data structure for an exemplary embodiment of the invention is provided.

Hardware and Operating Environment

Figure 1:
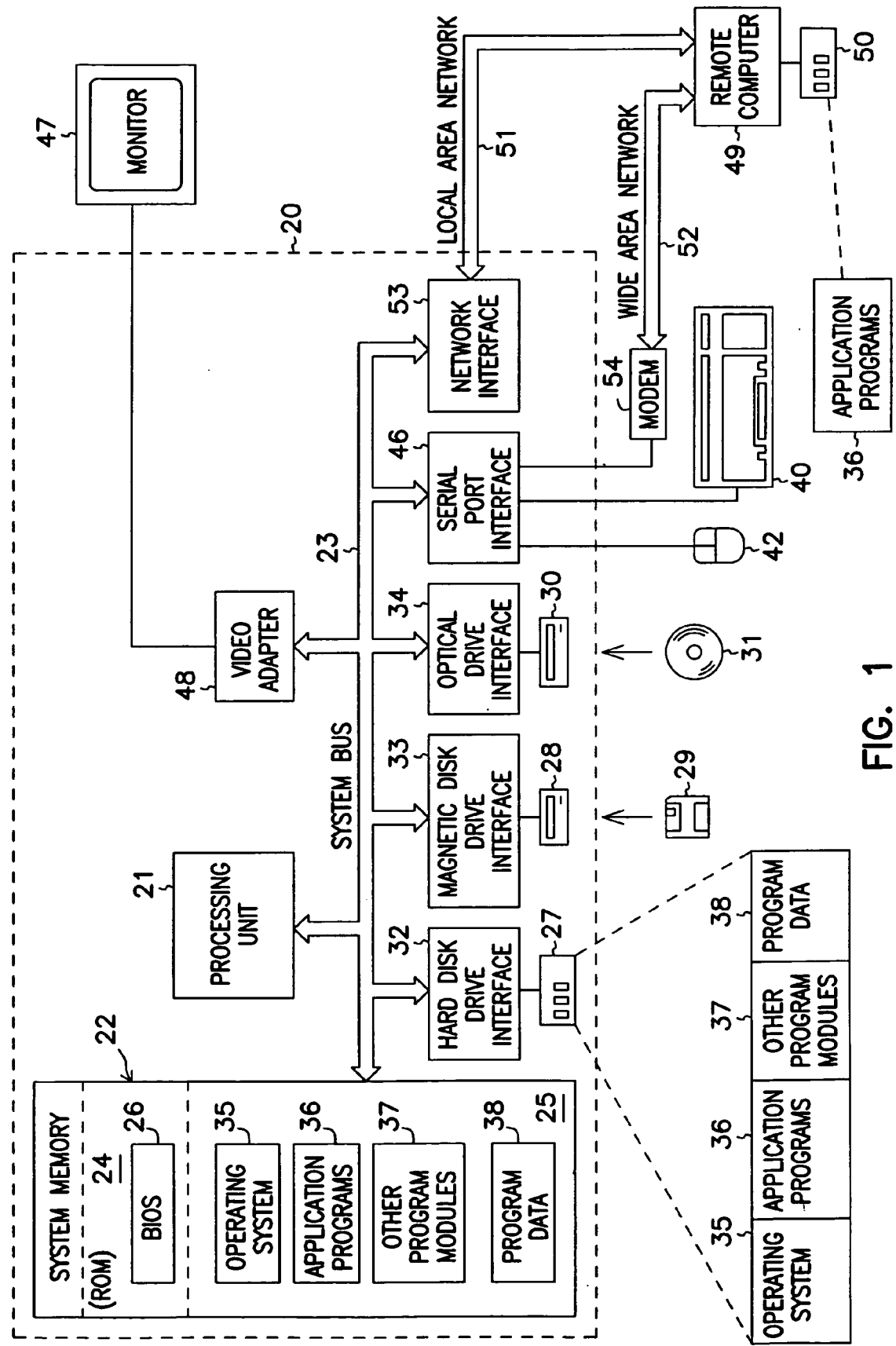
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
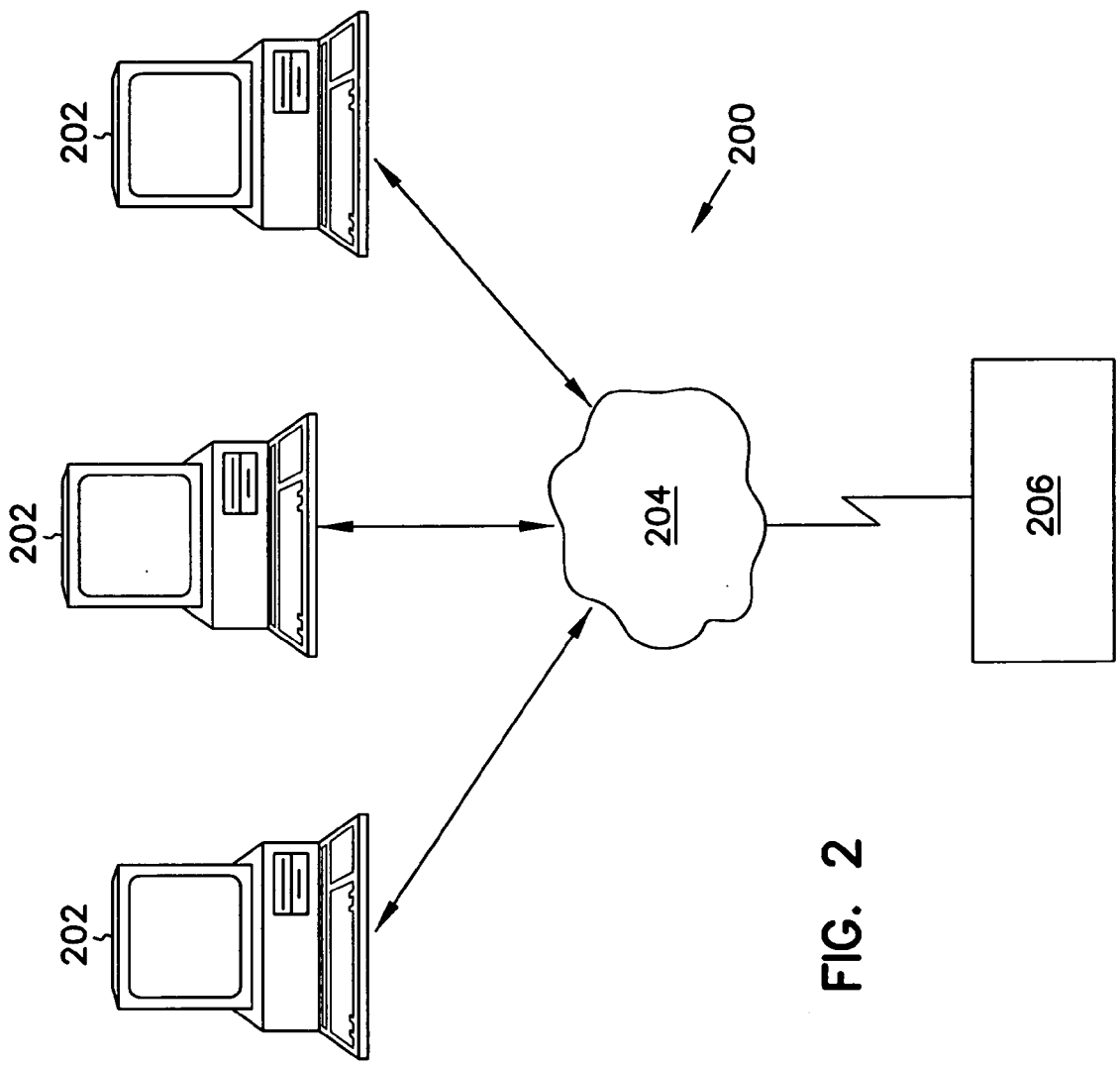
FIG. 2 is a diagram illustrating a system-level overview of an exemplary embodiment of the invention.

FIG. 2 is a diagram illustrating a computing environment 200 in which a scalable computing system associates annotations with a plurality of content sources. The computing environment 200 comprises one or more clients 202, a network 204, and a computing system 206. Each one of the clients 202 is coupled to the computing system 206 through the network 204. The computing system 206 associates annotations with a plurality of content sources and presents the annotations to a user of one of the clients 202.

The term "annotation" as used herein refers to any content associated with a document space. In one embodiment the content is a text file, a threaded message, an audio file, a video file, a calendar file or other scheduling information, a chat room and the like. The document space is any document identified with a document identifier (also referred to herein as a "context document identifier"). In one embodiment, the document space is a file identified by a file name, a directory path or a uniform resource locator (URL) and the like. The document space provides the context for the annotation.

Each one of the clients 202 comprises a user interface to display annotation information. In one embodiment, the user interface displays the annotation information independent of the document to which the annotation is associated. In such an embodiment, annotations are displayed in a manner that is non-intrusive to the original document and a user of client 202 does not require permission to edit the document in order to annotate the document. One example embodiment of such a user interface is a Web browser such as Microsoft's Internet Explorer brand web browser that displays annotations to a URL in a separate browser-panel. Another example embodiment of such a user interface is a client application capable of displaying annotations to a URL in a window separate from the Web browser. Still another embodiment of such a user interface is a client application capable of displaying annotations associated with documents from non-Web based application such as a Microsoft Excel brand spreadsheet or a Microsoft Word brand text file. In an alternate embodiment, the user interface displays the annotation information in a manner that incorporates the annotation with the document to which the annotation is associated. In this embodiment, the annotations are displayed in a manner that is intrusive to the original document.

The computing system 206 is based on an architecture that is capable of handling user requests for viewing and posting annotations to millions of documents each day. Even though the computing system 206 handles such large volumes of requests, the architecture of the computing system 206 is optimized to allow for easy and fast access to annotations. In order to handle requests for millions of annotations, the computing system 206 consists of multiple tiers of servers as described in more detail below.

Figure 3:
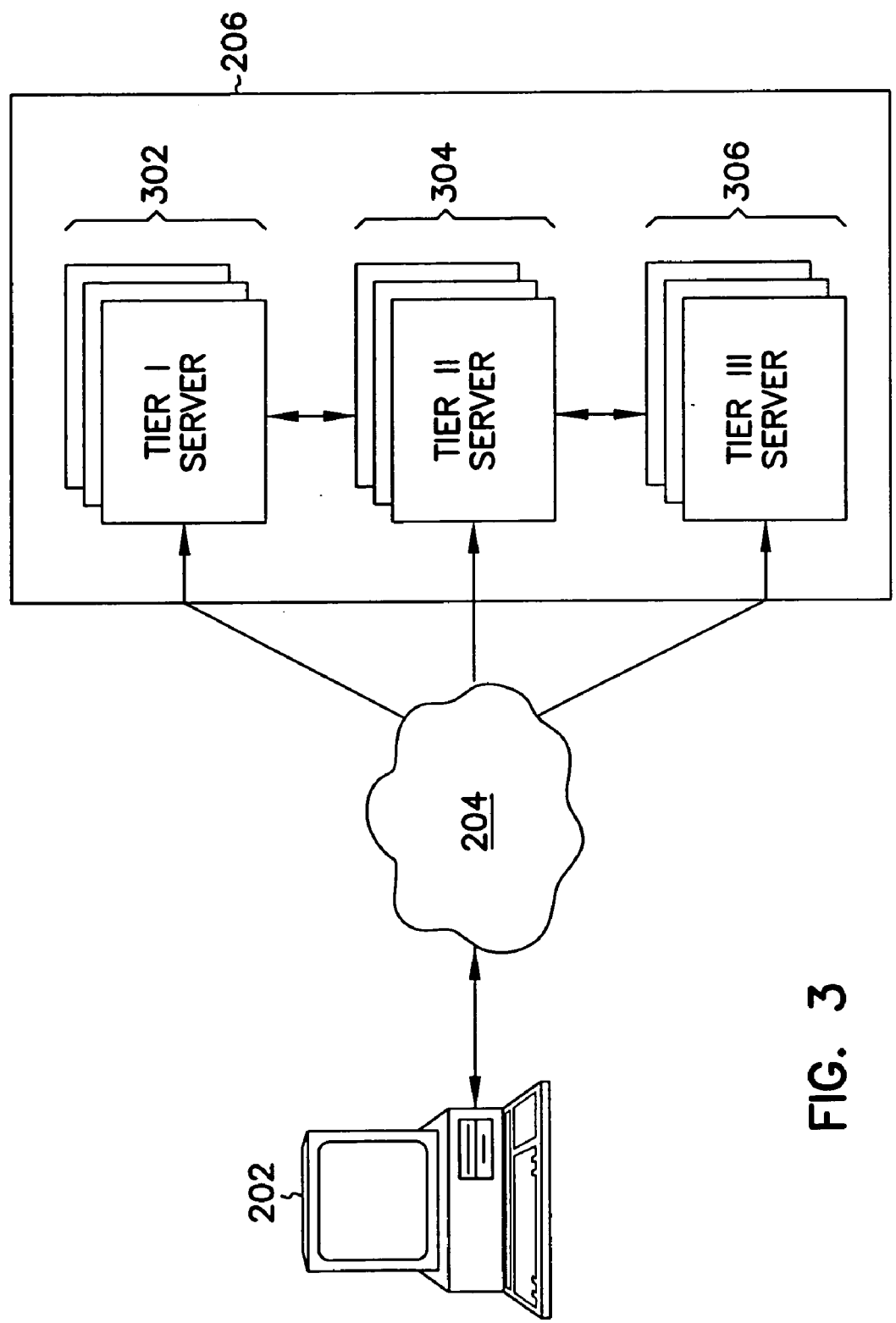
FIG. 3 is a diagram illustrating the components of one embodiment of a computing system for managing annotations to a plurality of content sources.

In one embodiment of the invention, the computing system 206 is implemented in conjunction with a multiple tier computing system for managing annotations as further described by reference to FIG. 3. FIG. 3 is a diagram illustrating the components of one embodiment of the computing system 206 for associating annotations with a plurality of content sources. FIG. 3 comprises a client 202, a network 204 and a computing system 206. In the embodiment shown in FIG. 3, the computing system 206 comprises three tiers of servers.

The client 202 is a computer running any software capable of displaying annotations. The client 202 interacts directly with a first tier, a second tier, and a third tier of the computing system 206.

The first tier of computing system 206 comprise one or more servers collectively referred to herein as a "tier I server" 302. The tier I server 302 indicates to the client 202 whether there are annotations associated with a current content source. The client 202 identifies the content source to the tier I server 302 using a document identifier. An example document identifier is a URL (Uniform Resource Locator) which provides an address for documents on the World Wide Web.

The tier I server 302 handles a large number of requests per second from clients, such as the client 202, and as a result must respond to the requests as fast as possible. If the tier I server 302 determines that there are no associations for the document identifier then the client request is answered with a response of "no associations" or the like. Therefore, one role of the tier I server 302 is to quickly respond to the client 202 when there are no associations and thus prevent further queries to the tier II server 304 and the tier III server 306 of computing system 206. Another role of the tier I server 302 is to quickly respond to the client 202 when annotations are associated with a document. In this role the tier I server 302 responds to the client with information that allows the client to retrieve an index of annotations associated with the document from the tier II server 304.

The second tier of computing system 206 comprise one or more servers collectively referred to herein as a "tier II server" 304. The tier II server 304 contains indices for the content of all annotations. In one embodiment, the tier II server 304 also stores annotation properties (such as generic annotation properties as further described in the next section). The client 202 is directed to the tier II server 304 by the tier I server 302. The client 202 communicates directly with the tier II server 304. The index maintained by the tier II server 304 is used to refer the client 202 to the tier III server 306 storing the actual annotation content.

The third tier of computing system 206 comprise one or more servers collectively referred to herein as a "tier III server" 306. The tier III server 306 stores actual annotation content. The client 202 is directed to the tier III server 306 by the tier II server 304. The client 202 communicates directly with the tier III server 306. The tier III server 306 provides a way to individually address each annotation in the tier III server data store. The client 202 uses this addressing mechanism along with the tier II server indices to retrieve annotation content. In one embodiment, the tier III server 306 stores the annotation body and all of the annotation properties that are not stored by the tier II server 304 (such as the annotation properties that are unique to a particular type of annotation as further described in the next section). Each tier III server 306 can store a single type of annotation or multiple types of annotations.

A system level overview of an example embodiment of a scalable computing system that manages annotations associated with a plurality of content sources has been described in this section of the detailed description. The computing system is optimized to allow for easy and fast access to annotations. The example embodiment comprises a tier I server, a tier II server, and a tier III server. However, one of ordinary skill in the art will appreciate that as the number of annotations grows, a fourth tier of servers may be added to the computing system. In still another embodiment, the architecture can be scaled down to operate as two tiers or even as a single tier (and even as a single server). In the case of a two-tier system, an example embodiment of an annotation comprises properties alone and does not contain a body. For example, the tier I server indicates whether or not there are annotations associated with a content source and the tier II server stores the properties of the annotation. In still another embodiment, the body of the annotation is itself a property and is stored on the tier II server. Alternately, for a single tier system, a tier I server indicates whether or not there are annotations associated with a content source and stores the properties of the annotation.

Annotations

An annotation is implemented as an object with properties. Properties for an example embodiment of an annotation include both generic properties that are common to all annotations and type-specific properties that are unique to a particular type of annotation.

Examples of generic annotation properties include type, author name, subject, creation time, modify time, time to live, content rating, document identifier and parent identifier and the like. The type property identifies the annotation type (for example, threaded message, chat, and the like). The author name property identifies the name of the author of the annotation. The subject property identifies the subject of the annotation. The creation time property identifies the date and/or time when the annotation was created. The modify time property identifies the date/or and time when the annotation was last modified. The time to live property identifies how long the annotation will persist in the computing system for managing annotations. The content rating property identifies a rating for the content of the annotation or, in an alternate embodiment, a rating for the content source. The document identifier identifies the web page or other document that the annotation is associated with. The parent identifier identifies the parent of the annotation if applicable.

The annotation is associated with a content source using a document identifier property. The document identifier property identifies the content source with which the annotation is associated. The document identifier property functions as a link to the document space. The link ties the annotation to the document or documents. The link property can be as precise or imprecise as desired by a specific implementation. For example, one annotation might merely link to a URL while another annotation might link to paragraph three (3), line seven (7), word two (2) of a URL. An annotation may link to multiple documents as well as to a single document.

Alternate embodiments having additional or differing combinations of generic annotation properties will be readily apparent to one of skill in the art and are contemplated as within the scope of the invention. For example, in an alternate embodiment, the body of the annotation is a generic annotation property referred to herein as a content property. In another alternate embodiment, the index entry for the body of the annotation is a generic annotation property referred to herein as an index property.

Examples of type-specific annotation properties comprise any properties unique to a particular type of annotation. For example, for a chat type annotation, examples of type-specific properties include room name, server, RSACi (Recreational Software Advisory Council on the Internet) ratings, description, and the like. For a Sprite type (an animated graphic image), examples of type-specific annotation properties include Running Time, Number of Frames, StartXPosition, StartYPosition and the like. For a text type annotation, an example of a type specific property is the character set encoding (such as ANSI) and the language. Alternate embodiments having additional or differing combinations of type-specific annotation properties will be readily apparent to one of skill in the art and are contemplated as within the scope of the invention.

Methods of an Exemplary Embodiment of the Invention

Figure 4:
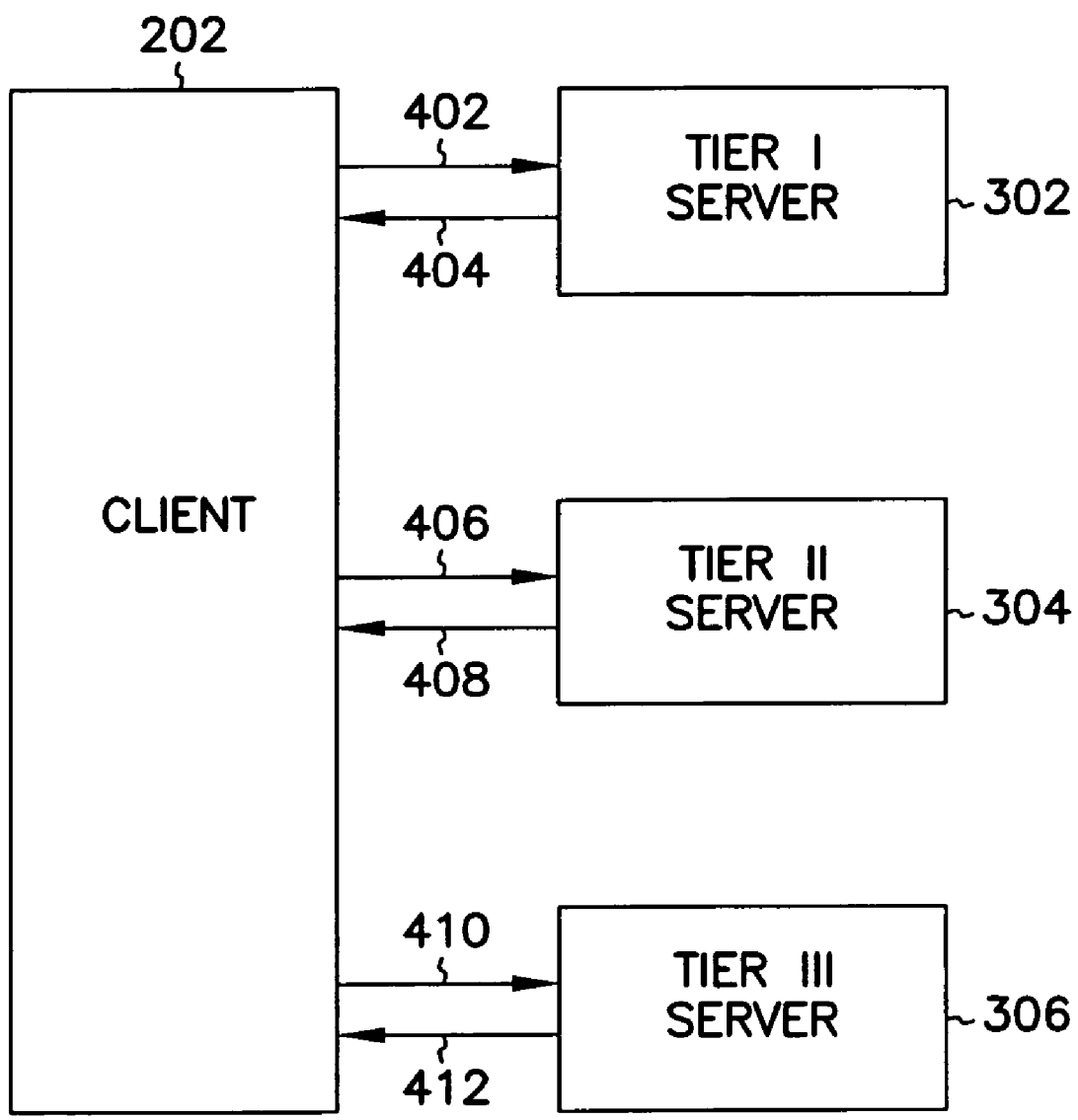
FIG. 4 is a data flow diagram illustrating a method of presenting an annotation that is associated with a content source according to an exemplary embodiment of the invention.

In this section, a particular method performed by a processor, such as processing unit 21 of FIG. 1, in an exemplary embodiment is described by reference to a data flow diagram. The method to be performed constitutes computer programs made up of computer-executable instructions. The method shown in FIG. 4 is implemented in a machine readable medium comprising machine readable instructions for causing a computer to perform the method. Such machine-readable medium may include software modules and computer programs. The computer programs comprise multiple modules or objects to perform the method. The type of computer programming languages used to write the code may vary from procedural code type languages to object oriented languages. The files or objects need not have a one to one correspondence to the modules or method steps described depending on the desires of the programmer. Further, the method and apparatus may comprise combinations of software, hardware and firmware as is well known to those skilled in the art. Describing the method by reference to a data flow diagram enables one skilled in the art to develop such programs including such instructions to carry out the methods on suitable computerized systems.

FIG. 4 is a data flow diagram illustrating of a method of presenting an annotation that is associated with a content source. A document identifier for a content source is sent to a tier I server (line 402). A first response is received from the tier I server (line 404). The first response comprises an indication of whether one or more annotations are associated with the document identifier and a reference to a tier II server maintaining additional information for each one of the annotations associated with the document identifier.

A request is sent to the tier II server for additional information for one of the annotations associated with the content source (line 406). A second response is received from the tier II server (line 408). The second response comprises one or more properties for the annotation and a reference to a tier III server for the annotation.

An annotation identifier for the annotation associated with the content source is sent to the tier III server (line 410). A third response is received from the tier III server (line 412). The third response comprises a body for the annotation identified by the annotation identifier.

Data Structures

Figure 5:
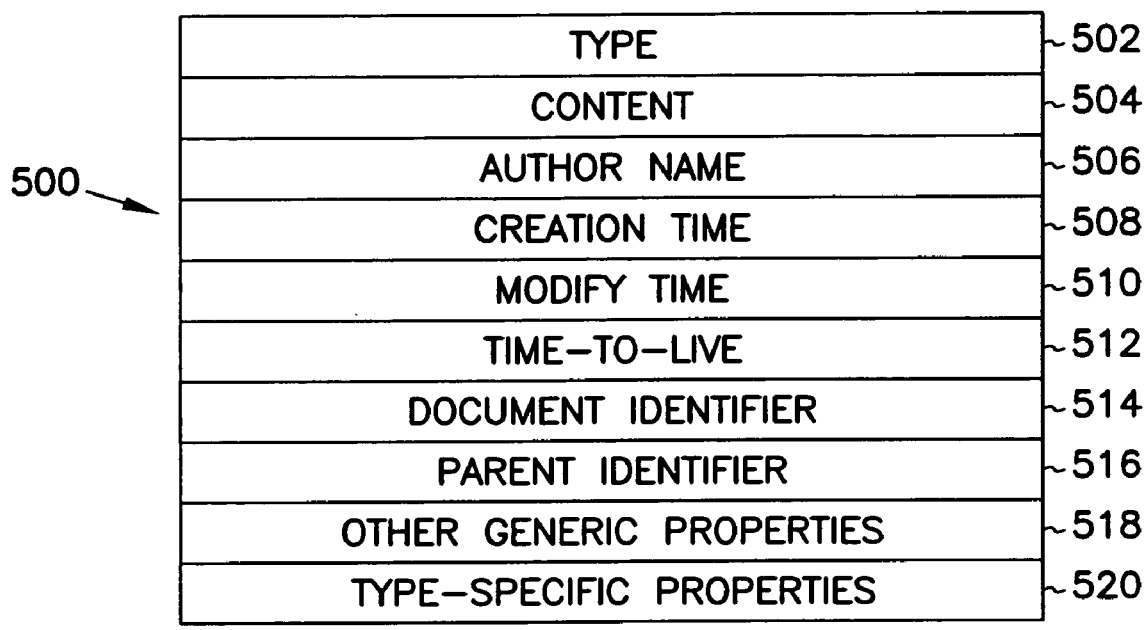
FIG. 5 is a diagram of a data structure for use in an example embodiment of the invention.

FIG. 5 is a block diagram of an example data structure used to implement an annotation. An annotation data structure 500 is shown in FIG. 5. The annotation data structure 500 shown in FIG. 5 comprises ten entries according to one embodiment of the invention. A type entry 502 contains data representing the annotation type. A content entry 504 contains data representing the text or the body of the annotation. An author name entry 506 contains data representing the name of the author of the annotation. A creation time entry 508 contains data representing the date and time when the annotation was created. A modify time entry 510 contains data representing the date and time when the annotation was last modified. A time-to-live entry 512 contains data representing how long the annotation will persist in the computing system for managing annotations. A document identifier entry 514 contains data representing the content source that the annotation is associated with. A parent identifier entry 516 contains data representing data representing the parent of the annotation (if applicable.) An other generic properties entry 518 contains other generic properties of the annotation. A type-specific properties entry 520 contains data representing one or more type-specific properties that are unique to a particular annotation type.

In this section, a data structure used to represent an annotation according to one embodiment of the invention have been described. Alternate embodiments in which the data structure has additional or differing properties will be readily apparent to one of skill in the art and are considered within the scope of the invention.

CONCLUSION

A computing system capable of associating annotations with millions of content sources has been described. An annotation is any content associated with a document space. The document space is any document identified by a document identifier. The document space provides the context for the annotation.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A scalable method of storing an annotation associated with a content source, the method comprising:
    representing an annotation as an object having a plurality of properties wherein one of the plurality of properties is a document identifier, the document identifier identifying the content source with which the annotation is associated; and
    storing the annotation and information about the annotation accessible using the document identifier on the servers of a multiple tier hierarchical annotation server system wherein the information about the annotation but not the annotation is stored on a lower tier server and the annotation is stored on a higher tier server.

2. The method of claim 1, wherein the act of representing the annotation as an object having a plurality of properties further comprises defining generic properties of the annotation.

3. The method of claim 2, wherein the generic properties are selected from the group consisting of: type, content, author name, creation time, modify time, time-to-live, document identifier, index and parent identifier.

4. The method of claim 3, wherein the type property of the annotation is selected from the group consisting of: a text file, a threaded message, an audio file, a video file, a calendar file, and a chat.

5. The method of claim 2, wherein the act of representing the annotation as a object having a plurality of properties further comprises defining one or more type specific properties unique to the annotation.

6. The method of claim 1, wherein the document identifier is selected from the group consisting of: a file name, a directory path, and a uniform resource locator.

7. A scalable method of retrieving an annotation associated with a content source, the method comprising:
    sending a document identifier associated with a content source to a tier I server, said tier I server being part of a multiple tier hierarchical annotation server system that also includes a tier II server, said tier I server storing minimal information regarding annotations associated with said content source, said minimal information including the existence of annotations associated with said content source and the identification of said tier II server if said annotations exist; and
    if an annotation is associated with the document identifier, receiving a reference from said tier I server to said tier II server, said tier II server maintaining additional information regarding the annotation associated with the document identifier.

8. The method of claim 7, further comprising displaying the first response in a manner that is non-intrusive to the content source.

9. The method of claim 7, further comprising displaying the first response in a manner that is intrusive to the content source.

10. The method of claim 7, wherein said multiple tier hierarchical annotation server system also includes a tier III server and further comprising:
    sending a request to the tier II server for said additional information regarding the annotation associated with the content source; and
    receiving a response from the tier II server, said response including a reference to said tier III server, said tier III server storing the annotation associated with the document identifier.

11. The method of claim 10 wherein said response from said tier II server also includes at least one property of the annotation, further comprising displaying the at least one property of the annotation in a manner that is non-intrusive to the content source.

12. The method of claim 10 wherein said response from said tier II server also includes at least one property of the annotation, further comprising displaying the at least one property of the annotation in a manner that is intrusive to the content source.

13. The method of claim 10, further comprising:
    sending to the tier III server an annotation identifier that identifies the annotation associated with the content source; and
    receiving a third response from the tier III server, wherein the third response comprises the annotation identified by the annotation identifier.

14. The method of claim 13, further comprising displaying the annotation identified by the annotation identifier in a manner that is non-intrusive to the content source.

15. The method of claim 13, further comprising displaying the annotation identified by the annotation identifier in a manner that is intrusive to the content source.

16. A computer readable medium comprising computer executable steps for executing a scalable method for storing an annotation associated with a content source, the method comprising:
    representing an annotation as an object having a plurality of properties wherein one of the plurality of properties is a document identifier, said document identifier identifying the content source with which the annotation is associated; and storing said annotation and information about the annotation accessible using the document identifier on the servers of a multiple tier hierarchical annotation server system wherein the information about the annotation but not the annotation is stored on a lower tier server, and the annotation is stored on a higher tier server.

17. The computer readable medium of claim 16, wherein the plurality of properties are selected from the group consisting of: type, content, author name, creation time, modify time, time-to-live, document identifier, index, and parent identifier.

18. The computer readable medium of claim 17, wherein the type property of the annotation is selected from the group consisting of: a text file, a threaded message, an audio file, a video file, a calendar file, and a chat.

19. The computer readable medium of claim 17, wherein the document identifier property of the annotation is selected from the group consisting of: a file name, a directory path, and a uniform resource locator.

* * * * *

UNITED STATES PATENT AND TRADEMARK OFFICE
CERTIFICATE OF CORRECTION

PATENT NO. : 6,973,616 B1
APPLICATION NO. : 09/339634
DATED : December 6, 2005
INVENTOR(S) : Cottrille et al.

Page 1 of 1

It is certified that error appears in the above-identified patent and that said Letters Patent is hereby corrected as shown below:

On page 2, in field (56), under "Other Publications", in column 1, line 3, delete "Ssytem" and insert -- System --, therefor.

In column 3, line 53, delete "a" and insert -- A --, therefor.

In column 8, line 1, delete "type specific" and insert -- type-specific --, therefor.

In column 9, line 63, in Claim 5, delete "type specific" and insert -- type-specific --, therefor.

Signed and Sealed this

Thirtieth Day of March, 2010

David J. Kappos
*Director of the United States Patent and Trademark Office*